Figure 1:
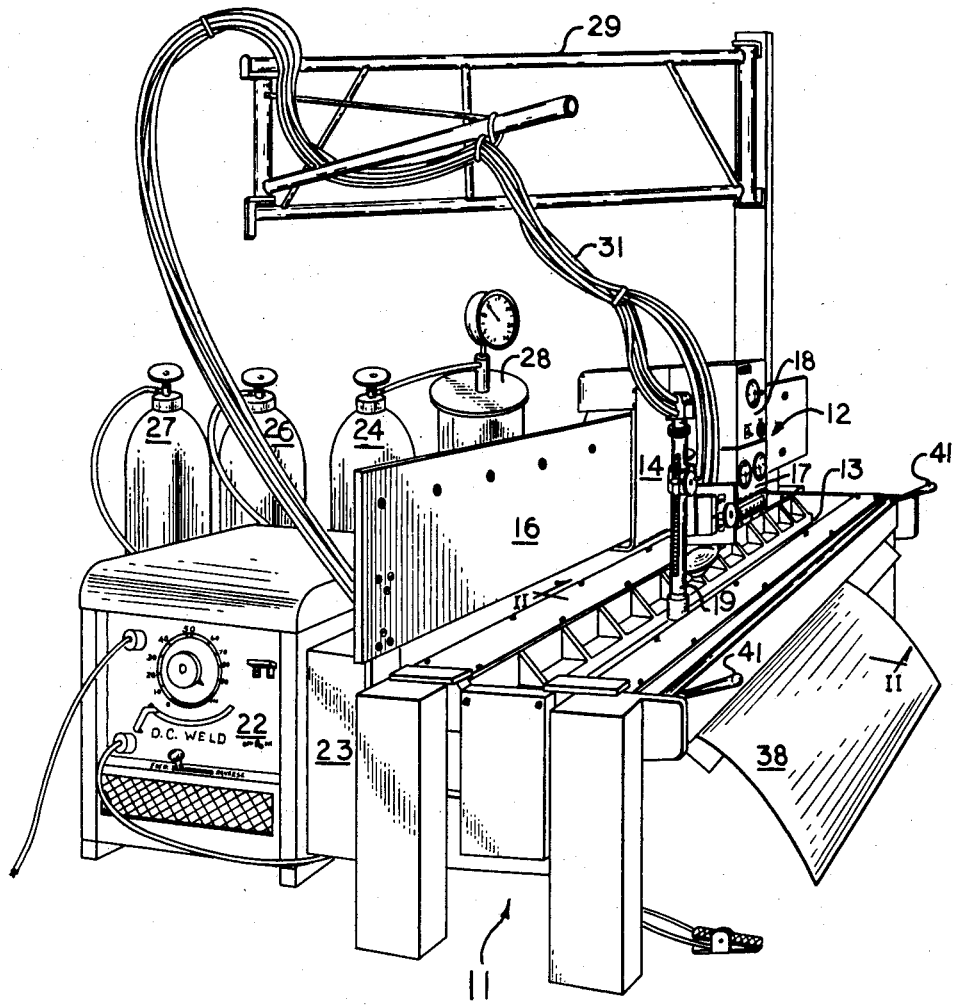

Jan. 26, 1960 J. C. COLLINS ET AL 2,922,870
THIN METAL WELDING METHOD AND APPARATUS
Filed March 10, 1958 2 Sheets-Sheet 1

INVENTORS
JAY C. COLLINS
SETH P. JENKINS
BY
ATTORNEY

INVENTORS
JAY C. COLLINS
SETH P. JENKINS
BY
ATTORNEY

_United States Patent Office_

2,922,870
Patented Jan. 26, 1960

2,922,870

THIN METAL WELDING METHOD AND APPARATUS

Jay C. Collins and Seth P. Jenkins, Fort Worth, Tex., assignors to General Dynamics Corporation, San Diego, Calif., a corporation of Delaware Application March 10, 1958, Serial No. 720,120

8 Claims. (Cl. 219—125)

This invention relates to an improved method and apparatus for welding metals and more particularly to the welding of very thin gauge metal wherein the weld is as strong as the parent part and the beaded surface has the aerodynamic smoothness required of outer surfaces of supersonic aircraft and missile structures.

As aircraft become progressively faster and faster, new techniques in the production of parts having a high strength to weight ratio become increasingly important. In one instance honeycomb panels were developed to replace conventional structural parts in elevons, engine nacelles and other parts of the aircraft. These panels consist of thin metallic honeycomb core material of desired configuration with thin metallic sheets bonded to it on both sides in a sandwich type construction. These sheets are paper thin, being from .002" to .032" thick. In the construction of these panels several widths of skin, i.e., thin sheets, must be joined together to provide a single sheet sufficiently large to form the required part. The edges of the paper thin sheets must be joined in such a manner that the joined portion is as strong as the sheets themselves and must possess an aerodynamic smoothness that will permit its use on the surface of a supersonic vehicle such as a rocket, missile or manned aircraft.

To the knowledge of the inventors there has been no past method of joining paper thin sheets of metal, such as stainless steel or titanium, in a manner to satisfy the above requirements. Known conventional welding processes proved unsatisfactory because the exceptionally thin gauge of the metal renders it very susceptible to the several inherent adverse effects of fusion, such as oxidation, voids, inclusions, burning, distortion and disruption of alloy balance. These effects are resultant factors of the application of high welding heat to metal alloys. For the same reason the close dimensional tolerances required of the weld thickness is practically impossible to achieve. Reducing the exposure time of the welding arc is necessary to prevent a burning through of the parent metal. However, the rate of travel must still be sufficiently slow to produce a welding fusion that completely penetrates the parent metal without burning or impairing its physical properties such as ultimate strength, yield strength, ductility etc. Heat dissipation from the metal has heretofore been accomplished by using double rows of highly conductive magnetic metal clamps, or "chill" clamps, between the object workpiece and the welding electrode, one on either side of and parallel to the weld joint or butt seam. However, this technique applied to the welding of paper thin metal sheets proved unsatisfactory as eddy currents, resulting from passing a welding current between two pieces of magnetic material, created a welding arc turbulence which made the arc too easily diverted from the desired path. Such condition was often sufficiently severe to cause a welding of the chill clamps to the workpiece.

Prior welding processes also employ a filler rod, a foremost contributor to the formation of slag which is conducive to corrosion of the metal being welded. Further, the use of a filler rod provides an instrument with which the operator may easily, though inadvertently breach the inert gas envelope normally used in the prior art practice to provide a shield against oxidation of the weld and adjacent metal surfaces. It is well established that when such shield is penetrated or ruptured by an object, ambient air will enter the breach and oxidation will occur.

It is customary to introduce and convey a shielding gas onto the underside of a tungsten inert gas weldment to prevent oxidation. This is usually done through a groove in the back-up bar underneath the welding path. However, this does not provide a contiguous envelope about the weld area and oxidation still occurs.

The results of prior welding processes therefore are susceptible to voids, inclusions and planes of strength declination in the penetrated area due to slow cooling and discrepancies in the gas shielding characteristics of the envelope. Inability to maintain adequate control of welding heat and uncontrolled heat dissipation produces hot spots and distortion. Inability to maintain constant dimensional tolerance requirements prevents optimum aerodynamic smoothness necessary for the use of the part in aircraft and missile applications.

These defects have been overcome in the welding method and apparatus comprising the present invention. Here a slow moving small arcing current is applied in an improved gas shield which is formed by the application of an inert gas on both sides of the sheets. No filler rod is used and a controllable heat sink is used to dissipate heat. The sheets are abutted and clamped in such a manner that there is no alignment error. The welding arc is very delicate yet sufficient to produce a fine fused bead that is aerodynamically smooth, and which possesses equal or superior tensile strength to that of the parent metal.

The present invention has for its prime object the provision of an improved process and apparatus for effecting a weld joint in thin gauge metal that will meet or exceed the high structural integrity standards as required for use in the construction of modern supersonic aircraft and missiles.

Another object of the present invention is to provide a superior process and apparatus for effecting weld joints in thin gauge metal which results in weldments that are within the minute dimensional tolerances for aerodynamic smoothness required for the operation of aircraft and missiles in the supersonic regimes.

Another object of the invention is to provide an improved method and apparatus for producing a high quality weld joint, in thin gauge metal, which completely penetrates the desired area of the base metal, with little or no effect on the physical properties thereof.

Another object resides in the provision of an improved method of welding thin gauge metal to thin gauge metal in a manner which substantially eliminates all voids or inclusions, due to welding heat, that are detectable by the present processes of X-ray testing.

Another object of the invention is to provide an improved process for effecting a weldment in thin gauge metal which will be virtually free from oxidation and will possess corrosion inhibitive properties substantially equal to those of the parent metal.

Another object is the provision of an improved process for welding thin gauge metal to metal in a manner that will substantially avoid any distortion of the parent metal due to welding heat.

Figure 3:
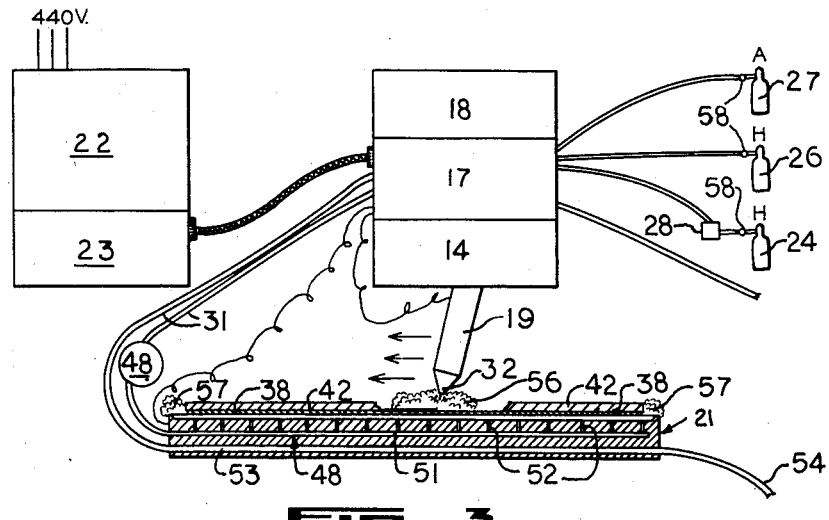
Figure 2:
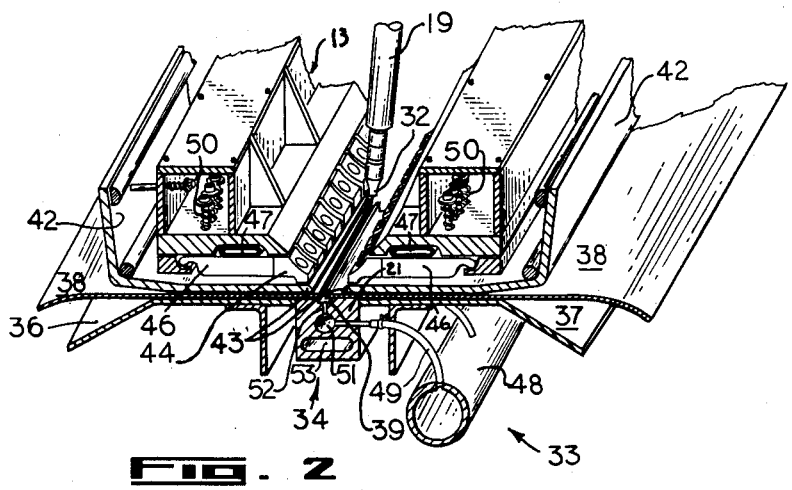

Other objects and features of the present invention will be readily apparent to those skilled in the art from the following specification and appended drawings wherein is illustrated a preferred form of the invention, and in which:

Figure 1 is a pictorial perspective view of apparatus employed in connection with the practice of the invention, Figure 2 is a detailed cross-section, taken along line 2—2 in Figure 1, which shows the preferred construction of the holding apparatus, heat dissipation and gas shield means used in the present invention, and Figure 3 is a diagram of the preferred arrangement of apparatus employed in connection with the present invention and shows the preferred flow path of gas and liquid.

Referring now to Figure 1 there is shown a welding table 11 on which is mounted a movable welding unit 12 and upon which the sheets to be joined are positioned and held in a holding fixture 13. The table also contains a heat dissipating means with a shielding system incorporated in a back-up bar more fully explained with reference to Figure 2. A side beam carriage 14 is mounted to move horizontally across the table 11 on side beam 16. On this carriage is mounted a central control panel 17, a speed control governor 18, and a welding head 19. The side beam carriage is carefully adjusted to provide the necessary vertical and horizontal alignment of the welding head 19 and back-up bar 21, shown in Figure 2, throughout the travel of the welding head. Since any deviation in alignment results in change in arc voltage, a dimensional tolerance of greater than .005 inch is not permitted.

An electric arc welder 22 and welder control unit 23 is connected through the central control panel 17 to the welding head 19. A selenium rectifier power source is preferred as it is more stable at low current settings. A high power factor is necessary on the primary side and a special tap is provided from 0.5 to 18 amps. Storage tanks 24 and 26 containing helium and tank 27 containing argon are connected through control panel 17 to welding head 19 and back-up bar 21 to form an inert gas shield to protect the welding seam from atmospheric contamination and oxidation. Helium from tank 24 passes through dryer 28 to reduce the moisture content before proceeding to weld head 19. Helium from tank 26 is connected to the shielding system in the back up bar and because of the surrounding heat need not be subjected to the drying action. A pivotal overhead support 29 holds the connections 31, consisting of electrical wiring, pneumatic and/or hydraulic hose, and allows them to move with carriage 14 without being in the way of the operator or moving parts.

Weld head 19 is employed to apply a gas shield around electrode 32 to substantially exclude atmospheric contaminations from the upper portion of the weld during the welding cycle. The weld head is set at a slight angle to cause the gas shield to lead the arc and electrode. Helium is desired for welding but at the low operating amperage used it will not ionize sufficiently to establish the starting arc even with superimposed, high frequency current. Since argon ionizes relatively easily at the low current settings required to provide a fairly cool arc until the two sheets of metal begin to fuse together, argon and a timed high frequency current is used for starting the welding operation. A starting cycle of about 15 seconds is usually ample time for the electrode to reach operating temperature and then a gas transfer valve in the connecting line switches over to helium. Helium is preferred to argon or a helium-argon mixture as the top shield for the remainder and bulk of the welding cycle because of its better cleaning action, hotter arcing properties and better control over the weld quality. Since high frequency current adds nothing to the stability of the welding arc, it is timed off when the gas transfer is made.

Control governor 18 regulates the travel speed of the welding head 19 across the welding table 11. Travel speeds of from 5 to 75 inches per minute are possible although speeds from 7½ to 21 inches are preferred because of better control of the weld and to obtain a more uniform bead. At this rate the arc penetrates the parent metal without burning or impairing its physical properties.

The electrode best suited for the welding operation is of 2% thoriated tungsten. It is preferably needle-thin, .040 inch in diameter, with a 45 degree tip polished to a scratch free surface. Repolishing between welding operations is recommended for best results.

Edge preparation of the workpiece sheets is very important since it affects the success of this type of fusion welded joint. Grinding, blanking, milling and slitting are current operations used although the slitting operation is preferred. Each sheet is thoroughly cleaned by vapor degreasing, after which the operator wears cotton gloves in handling. The gap between the sheets, after clamping by the holding fixture 13, should not exceed .004 inch at any point along the welding length. The thickness of the weld joint can be controlled very closely by the manner in which the inner edges of the workpieces are treated. Superior welds in thin gauge metal are obtained by lapping edges, butting edges, or flange butting edges. The preferred edge for weldments used in supersonic aircraft or missiles is a flange butting edge such as shown in Figure 2. These flanges furnish a slight reinforcement to the weld area without effecting intolerable thicknesses.

Figure 2 is a cross-sectional view of the welding table top showing the holding fixture 13, back up bar 21, subbead shield application system 33, and heat dissipation apparatus 34. Supporting members 36 and 37 are joined in the middle by a back-up bar 21 positioned under the travel path of welding head 19. The sheets of metal 38 to be joined are inserted between the members and the holding fixture in abutting relation along the groove 39 running longitudinally along the bar in alignment with the electrode tip 32. The groove 39 is .015 inch deep and .125 inch wide in this particular application and gas holes .040 inch in diameter are drilled one half inch apart along its full length.

After the sheets are properly aligned the holding fixture 13 is then operated by handles 41, shown in Figure 1, to hold the sheets 38 semi-permanently in place. The holding fixture 13 includes chill straps 42 which engage the top surfaces of the sheets and assist in their vertical edge alignment and heat dissipation. The inner edges of the chill straps 42 are spaced equidistant from the vertical centerline of the backup bar 21 and must be adjusted carefully for optimum results. The preferred strap spacing in the case of stainless steel is approximately twenty-five times the thickness of the metal sheets. The chill straps 42 are made of non-magnetic material having relatively high heat dissipating properties. The stock used is sufficiently thick to quickly absorb or dissipate the welding heat generated, but inner edges 43 are chamfered at a 45° angle down to approximately one quarter the original thickness so that the weld heat will not be removed from the sheets 38 before they are completely fused together.

Finger clamps 44, preferably of stainless steel, are closely positioned along the inner edges 43 of the chill straps 42. These fingers act as lever arms, pivoting in cradles 46, for exerting pressure on the chill straps 42. Springs 50 exert sufficient pressure to hold the sheets as positioned. Too much pressure or an uneven pressure causes deflection of the chill straps and a subsequent misalignment of the abutting edges of the sheets. A flexible hose 47 extends along the top of the clamps for transmittal of a uniformly applied pressure thereto. A pressure of 15 pounds per square inch is considered optimum.

When one of the sheets 38 has been positioned, air pressure is introduced into the inflatable pressure hose 47 which then expands against the self-aligning clamps 44 on that side of the back up bar. When this is done, the other sheet is then positioned and clamped. The force and manner with which the chill straps 42, sheets of parent metal 38 and the back up bar 21 maintain intimate contact, each with the other, effects a substantially airtight seal to hold the inert gas flow inside the groove 39 in the back up bar 21 and substantially deters all atmospheric contaminants from entering the groove 39.

As previously noted, back up bar 21 is longitudinally disposed along the centerline of the table 11 under the travel path of welding head 19. For maximum versatility in type of material to be welded with this apparatus, the back-up bar should be easily changeable in relation to its material type, but for general use in relation with stainless steel and titanium, it is preferably made of copper to provide a single terminal or electrode for welder 22, Figure 1. It is also used as an efficient means of applying the gas shield to the underside of the weld joint in the workpieces 38. A constant flow of pressurized inert gas, preferably helium, is supplied to a manifold 48 which, through equidistant connections 49, supplies a uniform pressure to a cylindrical reservoir 51, longitudinally and concentrically located in back-up bar 21 below the reservoir 51 along the longitudinal extent of the back-up bar. Groove 39, which furnishes an even gas flow to the weld joint, receives gas from reservoir 51, through a series of longitudinally equidistant, vertically disposed, cylindrical, open ended holes 52.

To prevent a heat buildup in back-up bar 21, passage 53 is provided longitudinally through back-up bar 21, for circulating a cooling fluid. This maintains a uniform temperature and reduces any uneven heating that might result in burning or warping of the sheets.

Figure 3 shows a schematic arrangement of apparatus used and the flow paths used. Here the welder control unit 23 interconnects the welder 22 with the central control panel 17 which in turn is connected to weld head 19 and back-up bar 21. The control governor 18 regulates the automatic travel of carriage 14 which moves the welding head longitudinally across the table 11. A coolant flows through the back-up bar 21 and to a suitable drain 54. Gas from argon tank 27 and helium tank 24 pass through the control panel 17 to the welding head 19 while gas from helium tank 26 passes to manifold 48 and to the groove 39 in back-up bar 21. The gas from weld head 19 forms the upper gas shield 56 while the gas from manifold 48 is uniformly distributed along groove 39 and permitted to escape at each end as shown by numerals 57. Here the chill straps 42 are broken away near the weld head to better show the top gas shield 56.

Before the welding operation is started, preliminary adjustments must be made on the apparatus in Figure 1, commensurate with the type and thickness of metal to be welded. After the sheets are inserted and positioned in abutting relation over the groove in the back-up bar and the chill straps are properly spaced in accordance with the thickness of the sheets, the welding head is adjusted for proper height over the seam. After the preliminary settings are completed and the cooling fluid has been started to circulating through back-up bar 21, the complete gas system, both top and bottom is purged with helium to remove any impurities in the lines. Argon is then introduced to the top side of the sheets 38 through the welding head, forming inert gas shield 56. As soon as an arc is struck or initiated, helium from tank 24 is switched on and argon from tank 27 is turned off. Pressure flow valves 58 are normally used to regulate the predetermined gas flow.

The lower gas shield system 33 is then connected and the travel switch for carriage 14 is turned "on." Welding is now in progress. When weld head 19 has moved from one end of the table 11 to the other, the power is turned off, and the sheets can be removed as a composite permanently integrated, structurally uniform, sheet of metal, with substantially the same physical properties as a like sheet of metal with no weld joint.

In the practice of this invention the following results may be considered exemplary:

(1) Gauge variations in the welded joint did not exceed the basic sheet tolerance of the material, in the test case, .001 inch.

(2) Tensile fatigue specimens withstood stress ranges from 20,000 pounds per square inch to 80,000 pounds per square inch for a minimum of 250,000 cycles.

(3) Tensile stress was in excess of 180,000 pounds per square inch.

(4) Elongation across the weld was within the 1% allowed over a 2 inch length.

(5) No evidence of intergranular attack after emersion in boiling copper sulphate solution for 24 hours. It is to be understood that these test results are by way of illustration and are not intended to be limitations upon the scope of this invention.

Thin gauge metal is exemplified by 0.002" through 0.032" stainless steel or titanium, but it is to be understood that changes in apparatus, such as a different current source or material used for the back-up bar, broaden the scope of metals weldable by this process, to any weldable material, such as aluminum, etc., and the gauge thickness is to be limited by practicability only.

As thus described, the thin gauge metal welding apparatus and process of the present invention is characterized as a unique application and combination of welding techniques employed to effect a desired high quality weld joint in thin gauge metal, thereby effecting a composite, permanently integrated, structurally uniform sheet of metal that will meet or exceed the high quality standards required for modern supersonic aircraft and missiles.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. The method of welding paper thin sheets of stainless steel, titanium and similar metals to produce an aerodynamically smooth weld comprising the steps of abutting the edges of said sheets to be welded throughout the length of the welding edges, clamping said edges in vertical alignment under a uniformly applied pressure, applying a low current arc at one end of said edges, applying a helium gas shield uniformly along the underside of said edges, applying an argon gas shield around said arc and subjecting said arc to a superimposed high frequency current until ionization occurs, thereafter removing said high frequency current and replacing said argon gas shield with a helium gas shield, moving said arc and gas shield therearound progressively along said edges at a slow travel speed to assure welding penetration through the thickness of said edges, and dissipating heat from said edges throughout the welding thereof to prevent burning and warping.

2. The method of welding paper thin sheets of stainless steel, titanium and similar metals to produce an aerodynamically smooth weld comprising the steps of abutting the edges of said sheets to be welded to within 004 inch throughout the length of the welding edges, clamping the edges in vertical alignment under a uniformly applied pressure, applying a low current arc within a .5 to 18 ampere range at one end of said edges, applying a gas shield uniformly along the underside of said edges, applying a gas shield around said arc and subjecting said arc to a superimposed high frequency current until ionization occurs, thereafter moving said arc and gas shield therearound progressively along said edges at a slow travel speed within a 7 to 21 inches per minute range to assure welding penetration through the thickness of said edges, and uniformly dissipating heat from said edges throughout the welding thereof to prevent burning and warping.

3. The method of welding paper thin sheets of stainless steel, titanium and similar metals to produce an aerodynamically smooth weld comprising the steps of abutting the edges of the sheets to be welded to within .004 inch throughout the length of the welding edges, clamping the edges in vertical alignment under a uniformly applied pressure, applying a low current arc within a .5 to 18 ampere range at one end of said edges, applying a helium gas shield uniformly along the underside of said edges, applying an argon gas shield around said arc and subjecting said arc to a superimposed high frequency current for approximately 15 seconds, thereafter removing said high frequency current and replacing said argon gas shield with a helium gas shield, moving said arc and gas shield therearound progressively along said edges at a slow travel speed within a 7 to 21 inches per minute range to assure welding penetration through the thickness of said edges, and uniformly dissipating heat from said edges throughout the welding thereof to prevent burning and warping.

4. A welding table for welding two thin sheets of metal in abutting relation with an aerodynamically smooth weld, said welding table having longitudinally extending sheet supporting members, a back-up bar extending in abutting relation between said members, a groove extending longitudinally along the top surface of said bar, a reservoir extending within said bar under said groove, a plurality of spaced holes communicating between said groove and said reservoir, a manifold having connections therealong communicating with said reservoir, means for connecting said manifold to a gas source to thereby supply said groove with a gas shield, said sheets being held in position in abutting relation over said groove by downward pressure on a plurality of finger clamps placed along the edges of said sheets.

5. A welding table for welding two thin sheets of metal in abutting relation with an aerodynamically smooth weld, comprising a welding table having longitudinally extending sheet supporting members, a back-up bar of electrically conductive and heat conducting material extending in abutting relation between said members, a groove extending longitudinally along the top surface of said bar, a reservoir extending within said bar under said groove, a plurality of spaced holes communicating between said groove and said reservoir, means for connecting said reservoir to a gas source to thereby supply said groove with a gas shield, a passageway extending along said bar beneath said groove, means for connecting said passageway to a fluid coolant source to thereby dissipate heat absorbed by said bar, said sheets being held in position in abutting relation over said groove by pressure on a plurality of finger clamps placed along the edges of said sheets, said clamps being pivotally mounted, and an inflatable hose extending longitudinally in contact with and over said clamps and, when inflated, operable to exert a uniform downward pressure through said clamps to said sheets to maintain said edges thereof in vertical alignment.

6. Means for welding two thin sheets of metal in abutting relation with an aerodynamically smooth weld comprising a welding table having longitudinally extending sheet supporting members, a back-up bar extending in abutting relation between said members, a groove extending longitudinally along the top surface of said bar, means for connecting said groove to a gas source to thereby supply said groove with a gas shield, said sheets being held in position in abutting relation over said groove by downward pressure on a plurality of finger clamps placed along the edges of said sheets, said clamps being pivotally mounted, an inflatible hose extending longitudinally in contact with said clamps and, when inflated, operable to exert a uniform downward pressure through said clamps to said sheets to maintain said edges thereof in vertical alignment, chill straps disposed between said sheets and said clamps, said straps being spaced on each side of said sheet edges and spaced from each other in the amount of approximately twenty-five times the thickness of said sheets.

7. Means for welding two thin sheets of metal in abutting relation with an aerodynamically smooth weld comprising a welding table having longitudinally extending sheet supporting members, a back-up bar extending in abutting relation between said members, a groove extending longitudinally along the top surface of said bar, a reservoir extending within said bar under said groove, a plurality of spaced holes communicating between said groove and said reservoir, a manifold having connections therealong communicating with said reservoir, means for connecting said manifold to a gas source to thereby supply said groove with a gas shield, a passageway extending along said bar beneath said groove, means for connecting said passageway to a fluid coolant source to thereby dissipate heat absorbed by said bar, said sheets being held in position in abutting relation over said groove by downward pressure on a plurality of finger clamps placed along the edges of said sheets, said clamps being pivotally mounted, an inflatable hose extending longitudinally in contact with and over said clamps and, when inflated, operable to exert a uniform downward pressure through said clamps to said sheets to maintain said edges thereof in vertical alignment, chill straps disposed between said sheets and said clamps, said straps being spaced on each side of said sheet edges and spaced from each other in the amount of approximately twenty-five times the thickness of said sheets.

8. Apparatus for welding paper thin sheets of stainless steel, titanium and similar metals to produce an aerodynamically smooth weld comprising means for abutting the edges of said sheets to be welded throughout the length of the welding edges, means for clamping said edges in vertical alignment under a uniformly applied pressure, means for applying a low current arc at one end of said edges, means for applying a helium gas shield uniformly along the underside of said edges, means for applying an argon gas shield around said arc and means for subjecting said arc to a superimposed high frequency current until ionization occurs, means for thereafter removing said frequency current and replacing said argon gas shield with a helium gas shield, means for moving said arc and gas shield therearound progressively along said edges at a slow travel speed to assure welding penetration through the thickness of said edges, and means for dissipating heat from said edges throughout the welding thereof to prevent burning and warping.

References Cited in the file of this patent

UNITED STATES PATENTS

| | | |
|---|---|---|
| 2,053,417 | Brace | Sept. 8, 1936 |
| 2,256,879 | Cornell | Sept. 23, 1941 |
| 2,475,357 | Miller | July 5, 1949 |
| 2,528,758 | King | Nov. 7, 1950 |
| 2,591,926 | Gibson et al. | Apr. 8, 1952 |
| 2,641,673 | Dahl | June 9, 1953 |
| 2,644,070 | Herbst | June 30, 1953 |
| 2,654,014 | Schaefer | Sept. 29, 1953 |
| 2,740,877 | Knouth et al. | Apr. 3, 1956 |
| 2,747,065 | Diehl | May 22, 1956 |
| 2,794,112 | Crow | May 28, 1957 |
| 2,852,660 | Maloney | Sept. 16, 1958 |

FOREIGN PATENTS

| | | |
|---|---|---|
| 516,119 | Canada | Aug. 30, 1955 |